US 6,727,465 B1

(12) United States Patent  (10) Patent No.: US 6,727,465 B1
Kislovsky et al.  (45) Date of Patent: Apr. 27, 2004

(54) APPARATUS FOR OVERLAY WELDING OF A TUBE EXTERIOR

(75) Inventors: Victor Kislovsky, Overland Park, KS (US); Warren Moss, Archie, MO (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/248,843

(22) Filed: Feb. 24, 2003

(51) Int. Cl.$^7$ ................................................ B23K 9/04
(52) U.S. Cl. ............................ 219/125.11; 219/76.11; 219/76.14
(58) Field of Search ........................ 219/125.11, 76.11, 219/76.14, 60 A, 60 R, 61

(56) References Cited

U.S. PATENT DOCUMENTS

| | | | |
|---|---|---|---|
| 3,209,119 A | * 9/1965 | Keidel et al. | 219/60 A |
| 3,611,541 A | * 10/1971 | Garrett | 219/76.11 |
| 4,593,849 A | 6/1986 | Doering | 228/29 |
| 4,782,206 A | * 11/1988 | Ayres et al. | 219/76.14 |
| 4,948,936 A | 8/1990 | Landry | 219/76.14 |
| 6,013,890 A | 1/2000 | Hulsizer | 219/76.14 |

* cited by examiner

Primary Examiner—Clifford C. Shaw
(74) Attorney, Agent, or Firm—Ernest Cusick; Gary M. Hartman; Domenica N. S. Hartman

(57) ABSTRACT

An overlay welding apparatus for depositing an overlay weld on rotating tube stock. The apparatus comprises an elongate frame and supports for rotating the tube stock about a central axis thereof. The tube stock is inclined relative to horizontal when supported by the supports, such that improved cooling is achieved with a cooling medium delivered to the interior of the tube stock as the tube stock rotates. The apparatus further comprises a welding carriage mounted to the frame and adapted for travel along the frame. The welding carriage supports an overlay welding head for depositing an overlay weld on a surface region of the tube stock as the tube stock is rotated, and supports a wash welding head for reducing a heat-affected zone in the surface region as the tube stock is rotated. A steady rest is mounted adjacent the welding carriage for movement with the welding carriage along the frame. The steady rest supports the portions of the tube stock subjected to the welding operations so as to reduce deformation of the tube stock during welding.

20 Claims, 6 Drawing Sheets

APPARATUS FOR OVERLAY WELDING OF A TUBE EXTERIOR

BACKGROUND OF INVENTION

1. Field of the Invention

The present invention generally relates to welding equipment and processes. More particularly, this invention relates to a welding apparatus adapted to deposit an overlay weld on a rotating tube, wherein the quality of the weld and the operation of the apparatus are enhanced as a result of structural and control features of the apparatus.

2. Description of the Related Art

Overlay welding generally involves depositing weld material over a surface region in a series of beads with some lateral overlapping, forming a continuous layer of weld material that increases the thickness and strength of the region. Overlay welds are often deposited by shielded metal-arc welding in the restoration of tubes and vessels used in industries such as utilities, co-generation refining, petrochemical, pulp and paper, and waste-to-energy. A particular use of overlay welds is in the reinforcement and repair of tubular members, such as boiler tubes, small pressure vessels, nozzles and pipe sections of a boiler. Boiler tubes provided with an overlay weld coating offer much longer tube life, reducing costly unscheduled maintenance outages and significantly improving boiler availability.

Overlay weld material can be deposited on tube stock manually or with the use of an automatic or semiautomatic welding machine on which the tube stock is mounted. An example of an automatic overlay welding apparatus is disclosed in U.S. Pat. No. 6,013,890 to Hulsizer. The apparatus is configured to horizontally support and rotate a tube stock on its axis as the overlay weld is deposited, resulting in what can be termed a spiral weld. An overlay weld is deposited by a first welding head (preferably a metal inert gas (MIG) torch), and then washed with a second welding head (preferably a tungsten inert gas (TIC) torch) to eliminate a heat affected zone (HAZ) formed in the surface of the tube stock when the overlay weld was deposited. Water is flowed through the tube stock during the welding operation in order to control the temperature of the tube sock and the rate of cooling of the overlay weld. The Hulsizer apparatus makes use of a wheeled carriage that carries the overlay and wash welding heads, and travels along the length of a frame that supports the tube stock being welded. Tube stock supports are placed along the length of the frame to support the rotating tube, and must be moved occasionally to avoid the wheeled carriage as it travels the frame length.

Accuracy and consistency of all parameters are critical during an overlay welding process, especially when the article being welded must be both supported and manipulated during welding, as is the case with spiral overlay welding operations performed on rotating tube stock. Further complicating the overlay process is the need to comply with a wide range of specifications, such as minimal weld penetration, low dilution, complete fusion, homogeneous deposits, very low heat input, and minimum deposit thickness, e.g., on the order of 0.060 to 0.070 inch (about 1.5 to 1.8 mm). A variety of welding defects can occur in an overlay weld process, including cold laps on weld overlay starts and stops, burn-throughs, and overlay deposited with improper shielding gas pressure (necessitating removal and re-application of the weld). Furthermore, with existing overlay welding equipment, tube stock is prone to overheating and deformation as a result of being inadequately cooled and supported. Existing overlay welding equipment also have a limited level of integration in terms of controlling various critical welding parameters, such as shielding gas pressure, wire feed rates, tube rotation speed, carriage travel speed, etc. Any of these parameters can, if not properly controlled, lead to inconsistencies in the thickness of the weld deposit, which may necessitate the removal and re-application of the overlay.

In view of the above, it would be desirable if an improved overlay welding apparatus were available for depositing overlay welds on tube stock.

SUMMARY OF INVENTION

The present invention provides an overlay welding apparatus for depositing an overlay weld on rotating tube stock, and which provides improved support and thermal management for the tube stock and improved control of the welding parameters, with the overall effect of increasing the quality and consistency of the overlay weld. More particularly, the invention is an electric-arc welding overlay apparatus with improvements that render the apparatus more reliable and highly integrated in comparison to prior art apparatuses used to deposit overlay welds on tube stock.

The apparatus of this invention generally comprises an elongate frame and first and second support means for supporting a tube stock relative to the frame and for rotating the tube stock about a central axis thereof. The tube stock is inclined relative to horizontal when supported by the first and second support means, such that improved cooling is achieved with a cooling medium delivered to the interior of the tube stock as the tube stock rotates on the frame. The apparatus further comprises a welding carriage mounted to the frame and adapted for travel along the frame. The welding carriage supports an overlay welding head for depositing an overlay weld on a surface region of the tube stock as the tube stock is rotated, and further supports a wash welding head for reducing a heat-affected zone in the surface region as the tube stock is rotated. A steady rest is mounted adjacent the welding carriage for movement with the welding carriage along the frame. The steady rest is adapted to rotatably support a portion of the tube stock in close proximity to the surface regions of the tube stock on which the overlay weld is being deposited and the heat-affected zone is being reduced by the overlay and wash welding heads, respectively, so as to better support the tube stock and reduce deformation of the tube stock during the welding operation.

The welding apparatus also preferably includes electronic circuitry that provides better control of the overlay and wash welding heads along the desired weld path, as well as better control of tube stock rotation, welding current, wire feed speed and oscillation speed. The apparatus also preferably includes a feedback capability that can address errors and failures of the various components of the apparatus, including shielding gas, tube stock rotation, carriage travel, etc., thereby reducing the incidence of cold laps, burn-throughs, and overlay deposited with improper shielding gas pressure. The invention utilizes the above improvements and preferred aspects to provide an overlay welding apparatus that is highly integrated and reliable as compared to overlay welding apparatuses of the prior art, yet is sufficiently uncomplicated to be used by operators with limited experience.

Other objects and advantages of this invention will be better appreciated from the following detailed description.

DETAILED DESCRIPTION

Figure 1:
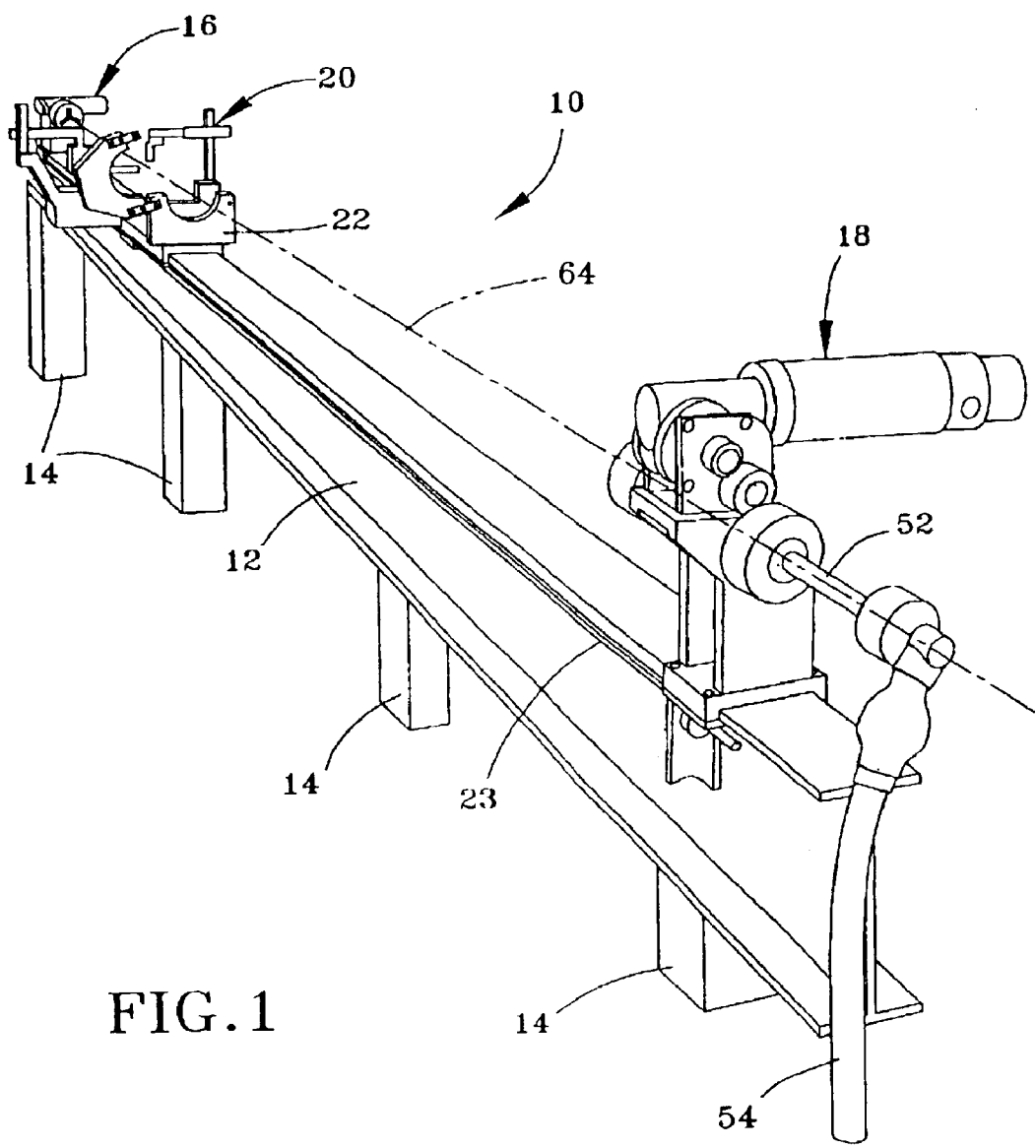
FIG. 1 is a perspective view of an arc-welding overlay apparatus in accordance with a preferred embodiment of the present invention.

FIG. 1 depicts an overlay welding apparatus 10 in accordance with a preferred embodiment of the invention, with FIGS. 2 through 6 representing various modular components of the apparatus 10. As seen in FIG. 1, the apparatus 10 comprises an elongate frame 12, shown here as an I-beam though other types of frames could foreseeably be used. The frame 12 is supported on a number of columns 14. According to a preferred aspect of the invention, the columns 14 support the frame 12 so that the frame 12 is inclined to the horizontal. A preferred angle of inclination is about five degrees to horizontal, though lesser and greater angles of inclination could be effective and practical for reasons to become apparent from the following discussion.

Figure 2:
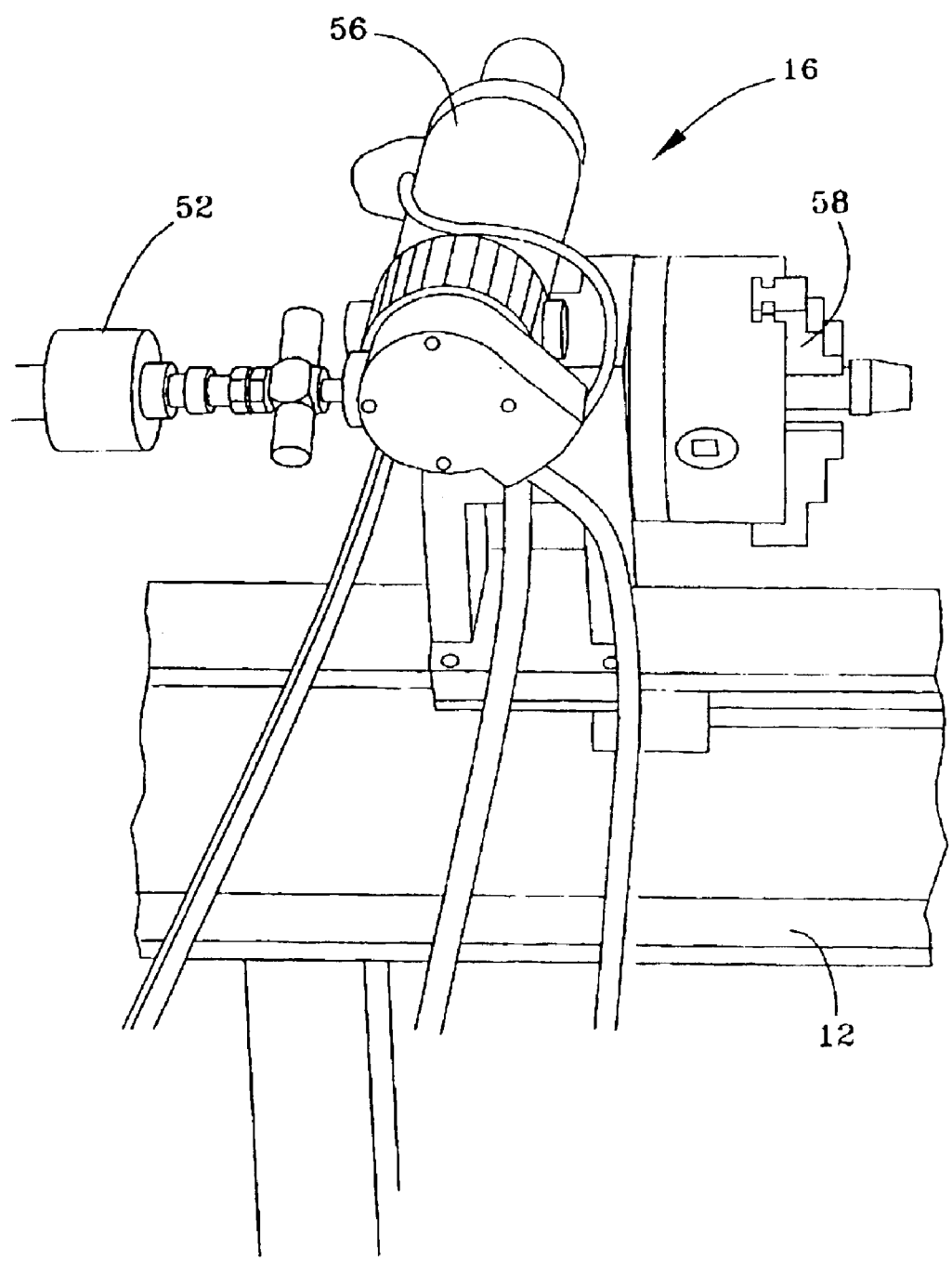
FIGS. 2 and 3 are more detailed views of head and tail stock assemblies, respectively, of the apparatus of FIG. 1.
Figure 3:
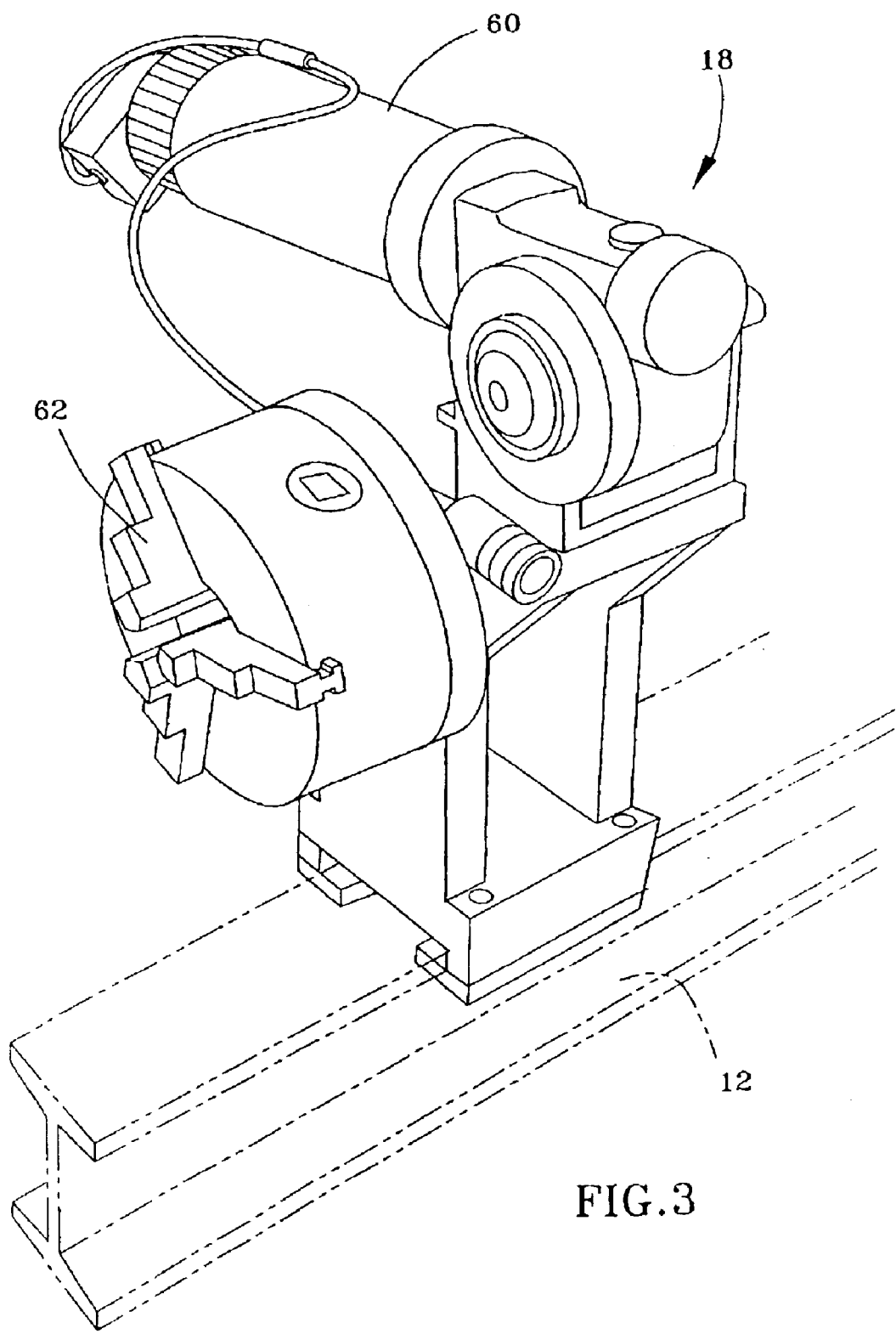

The overlay welding apparatus 10 of this invention is configured to deposit what can be termed a "spiral" overlay weld on a tube stock (whose axis is indicated by reference number 64 in the Figures). The overlay weld is "spiraled" as a result of the tube stock being rotated while a welding carriage assembly 20 carrying welding heads 24 and 26 travels along the length of the frame 12. In FIG. 1, the apparatus 10 is represented as being adapted to support the oppositely-disposed ends of a tube stock with head and tail stock assemblies 16 and 18 mounted to the frame 12. FIGS. 2 and 3 are more detailed views of the head stock and tail stock assemblies 16 and 18. The head stock assembly 16 is shown as comprising a chuck 58 for gripping the tube stock, and a motor 56 for rotating the chuck 58 (and the tube stock held thereby). Similarly, the tail stock assembly 18 is shown in FIG. 3 as comprising a chuck 62 for gripping the opposite end of the tube stock, as well as a motor 60 for rotating the chuck 62. The head and tail stock assemblies 16 and 18 are also shown as being equipped with fittings 52 and a supply line 54 for flowing a cooling medium, such as water, through the interior of the tube stock as it rotates on the apparatus 10. Suitable fluid-tight couplings for the fittings 52 are well known in the art, and therefore do not require any further discussion.

It has been determined that, by inclining the rotating tube stock during overlay welding, a more uniform coolant flow pattern is achieved within the tube stock and the development of air pockets within the cooling medium is inhibited. As a result, the apparatus 10 of this invention is characterized by improved cooling of the tube stock and a reduced likelihood of localized overheating in the vicinity of the welding operation, with the overall effect being increased quality and consistency of the overlay weld.

Figure 4:
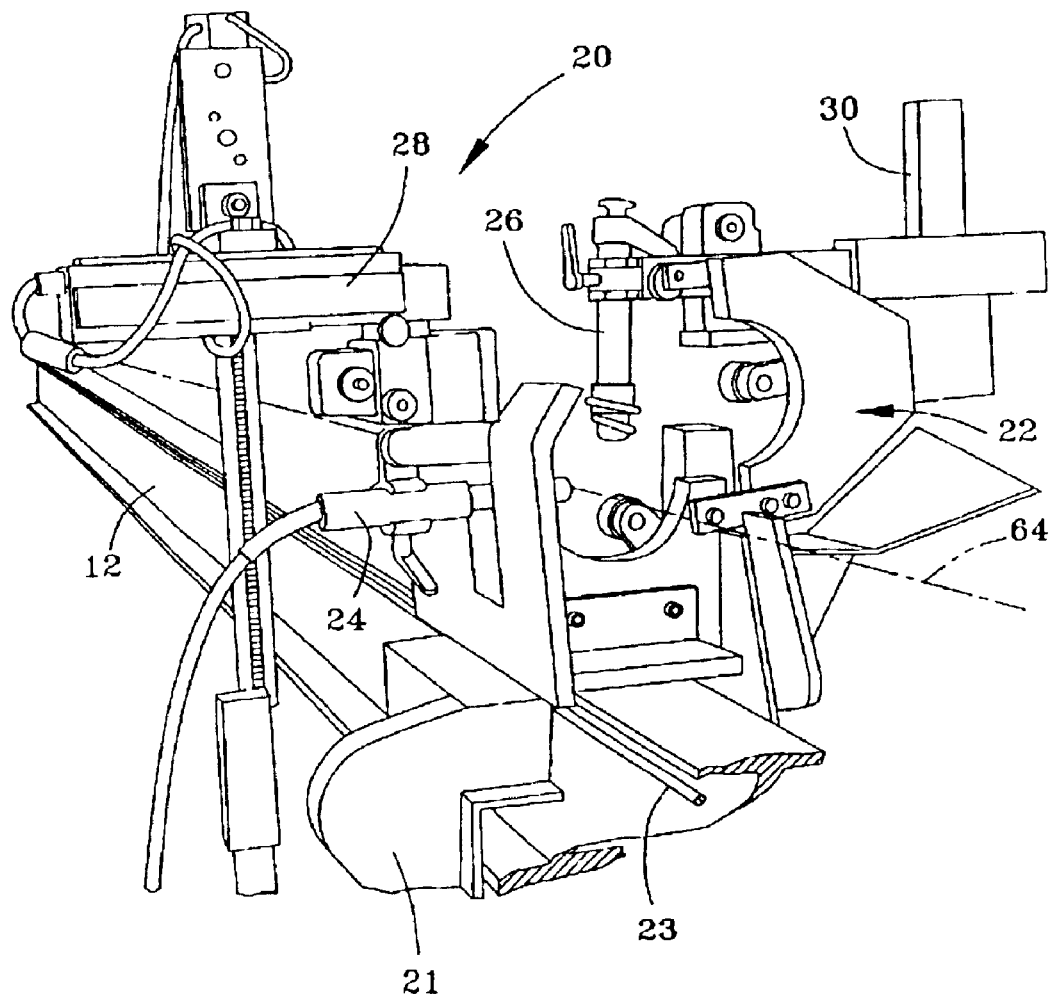
FIG. 4 is a more detailed view of a welding head carriage assembly of the apparatus of FIG. 1.

The welding carriage assembly 20 is shown in greater detail in FIG. 4, and is seen as having a modular construction comprising a carriage 21 that supports a steady rest 22 immediately adjacent the two separate welding heads 24 and 26, one of which is mounted horizontally while the second is mounted vertically above the axis 64 of the tube stock. The carriage assembly 20 is caused to travel along the length of the frame 12 with a drive shaft 23 that is driven by a carriage motor (not shown). The welding heads, or torches, 24 and 26 may be of any suitable metal-arc type, though the use of a wire filler material and shielding gas is preferred. A gas metal arc welding (GMAW; or metal inert gas (MIG)) torch is preferred for the overlay welding head 24, while a tungsten inert gas (TIG) torch is preferred for the wash welding head 26. In accordance with known practice, the TIG torch 26 is operated to eliminate the heat-affected zone (HAZ) that forms in the surface of the tube stock when the overlay weld was deposited by the overlay welding head 24. Shielding gas is routed through each of the welding heads 24 and 26.

Figure 6:
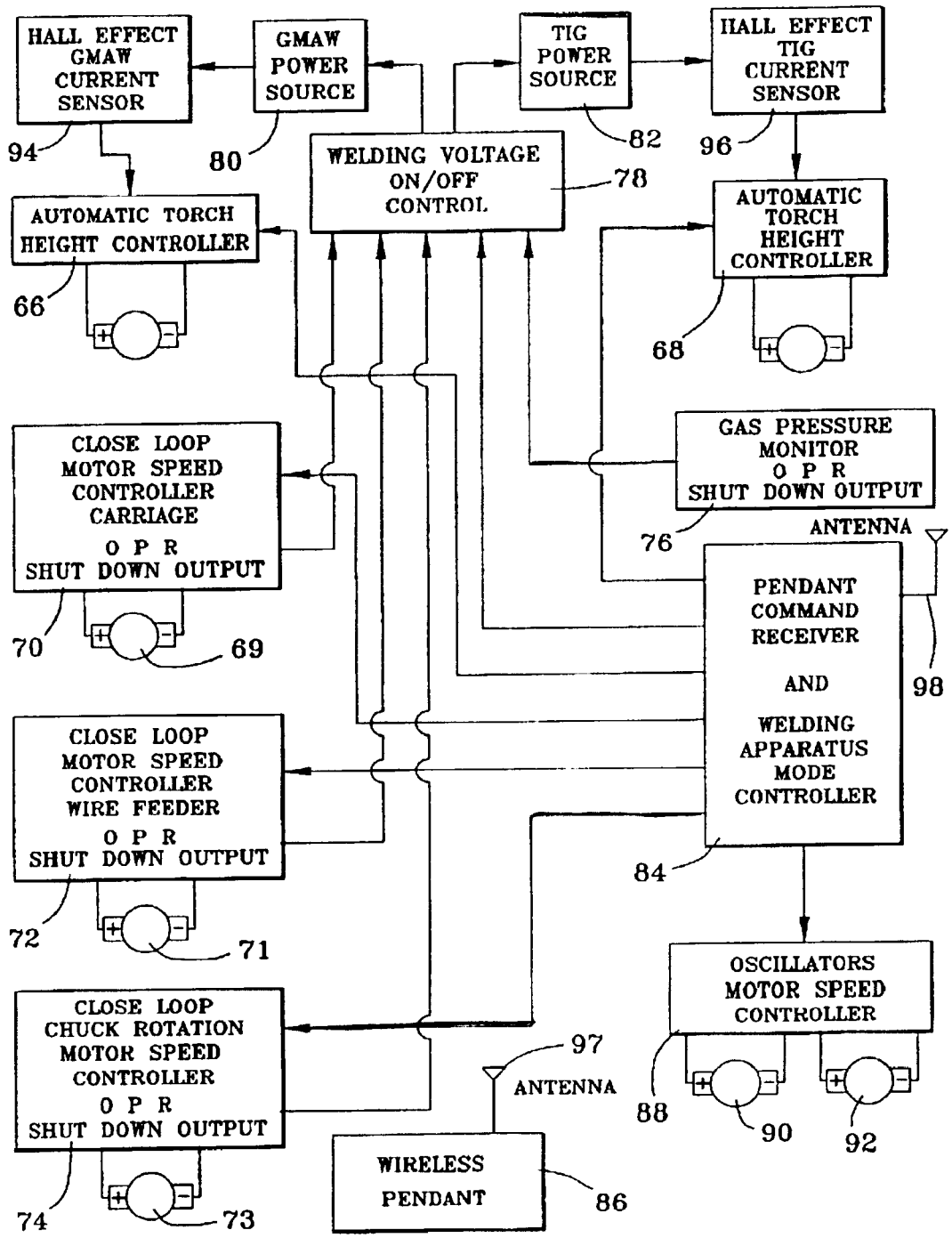
FIG. 6 is a block diagram of a control system for the apparatus of FIG. 1 in accordance with a preferred embodiment of the present invention.

FIG. 6 is a block diagram of a control system for the overlay welding apparatus 10, and shows welding power sources 80 and 82 that provide the welding currents for each of the welding heads 24 and 26. The power sources 80 and 82 are pulsed power sources preferably capable of delivering direct or alternating current, depending on the welding process, the wire (filler) material, the type of shielding used, and the material of the tube stock. The power sources 80 and 82 are indicated in FIG. 6 as being controlled by a weld voltage ON/OFF control 78, which enables the welding current to be quickly terminated under certain conditions, as discussed below. As also evident from FIG. 6, each of the welding heads 24 and 26 is preferably equipped with an oscillator motor (90 and 92 in FIG. 6) controlled by an oscillator controller (88 in FIG. 6), causing their associated welding torch 24 and 26 to oscillate in a direction parallel to the weld bead, i.e., parallel to the travel of the welding heads 24 and 26 relative to the tube stock. The controller 88 preferably utilizes digital potentiometers to regulate the speed of the motors 90 and 92, which may be calibrated in strokes per minute. The output of the controller 88 is preferably limited to 0 to 30 VDC at 1.5 amperes.

As shown in FIG. 4, the carriage assembly 20 also includes index arms 28 and 30 by which the positions of the welding heads 24 and 26 relative to the tube stock can be adjusted, particularly the torch height, i.e., the distances between the heads 24 and 26 and their respective adjacent surface regions of the tube stock. FIG. 6 depicts the control system as including two programmable automatic torch height controllers 66 and 68, one for each of the welding heads 24 and 26. Through positional feedback from two Hall-effect current sensors 94 and 96, the torch height controllers 66 and 68 are able to precisely control the distance between the GMAW and TIG torches and the adjacent surfaces of the tube stock by sensing weld current by controlling the movement of the index arms 28 and 30. Through feedback from the current sensors 94 and 96, the torch height controllers 66 and 68 operate to maintain a constant arc length for each torch as it passes over any surface irregularities in the tool stock, thereby maintaining a substantially constant voltage drop.

A wire feed motor 71 (represented schematically in FIG. 6) feeds wire filler to the overlay welding head 24 at an appropriate speed, which will depend in part on the material, diameter, etc., of the weld wire used. A controller 72 for the wire feed motor is also represented in FIG. 6. The controller 72 preferably utilizes feedback to regulate the wire feed rate to a programmed value, and communicates with the weld voltage ON/OFF control 78. If wire feed speed is below a preset lower limit to the desired speed, an "OFF" signal is sent to the ON/OFF control 78, which in turn shuts down the welding power sources 80 and 82.

In addition to the control and feedback for torch height control and wire feed for the welding heads 24 and 26, FIG. 6 shows the control system of this invention as also including closed-loop (feedback) controllers 70, 74 and 76 for the carriage motor, rotation (head stock) motor, and shielding gas pressure, respectively. Each of these controllers 70, 74 and 76 are preferably programmed to have preset ranges for their respective targets, and communicate with the ON/OFF control 78 so that the control 78 is able to interrupt welding current to the power sources 80 and 82 for the welding heads 24 and 26 if the carriage motor 69, rotation motor 73, and/or shielding gas pressure are outside their permitted ranges. For example if carriage travel speed falls below a preset lower limit, the carriage motor controller 70 sends an "OFF" signal to the ON/OFF control 78, which in turn shuts down the welding power sources 80 and 82 to prevent burn-through. As another example, the shielding gas pressure controller 76 is preferably operated to continuously monitor shielding gas pressure, which typically will have two preset limits, e.g., a lower 25 psi (about 0.21 MPa) limit and an upper 70 psi (about 0.64 MPa) limit. If the shielding gas pressure is within this range, the weld voltage ON/OFF control 78 is enabled. Audible and visual warnings preferably occur if a gas pressure at the lower or upper limit of the acceptable range is detected. At gas pressures sufficiently outside the permitted range (e.g., 20 psi (about 0.18 MPa)), the ON/OFF control 78 preferably shuts down the power sources 80 and 82, thereby avoiding a circumstance in which an overlay weld must be removed and a weld repeated because of improper gas pressure.

A unit identified in FIG. 6 as "pendant command receiver and welding apparatus mode controller," hereinafter weld mode controller 84, controls the sequence of events during the welding cycle. An automatic welding cycle can preferably be initiated through a switch on a wireless pendant 86 that communicates with the weld mode controller 84 through antennas 97 and 98. The pendant 86 also preferably houses input controls for rotation of the tube stock, travel speed of the welding carriage assembly 20 along the frame 12, the electric power source 80 and 82, the wire feeder, and the shielding gas. Though the welding apparatus 10 is intended for operation in a machine welding cycle, it is foreseeable that the controller 84 could allow for both automatic and manual welding modes.

Figure 5:
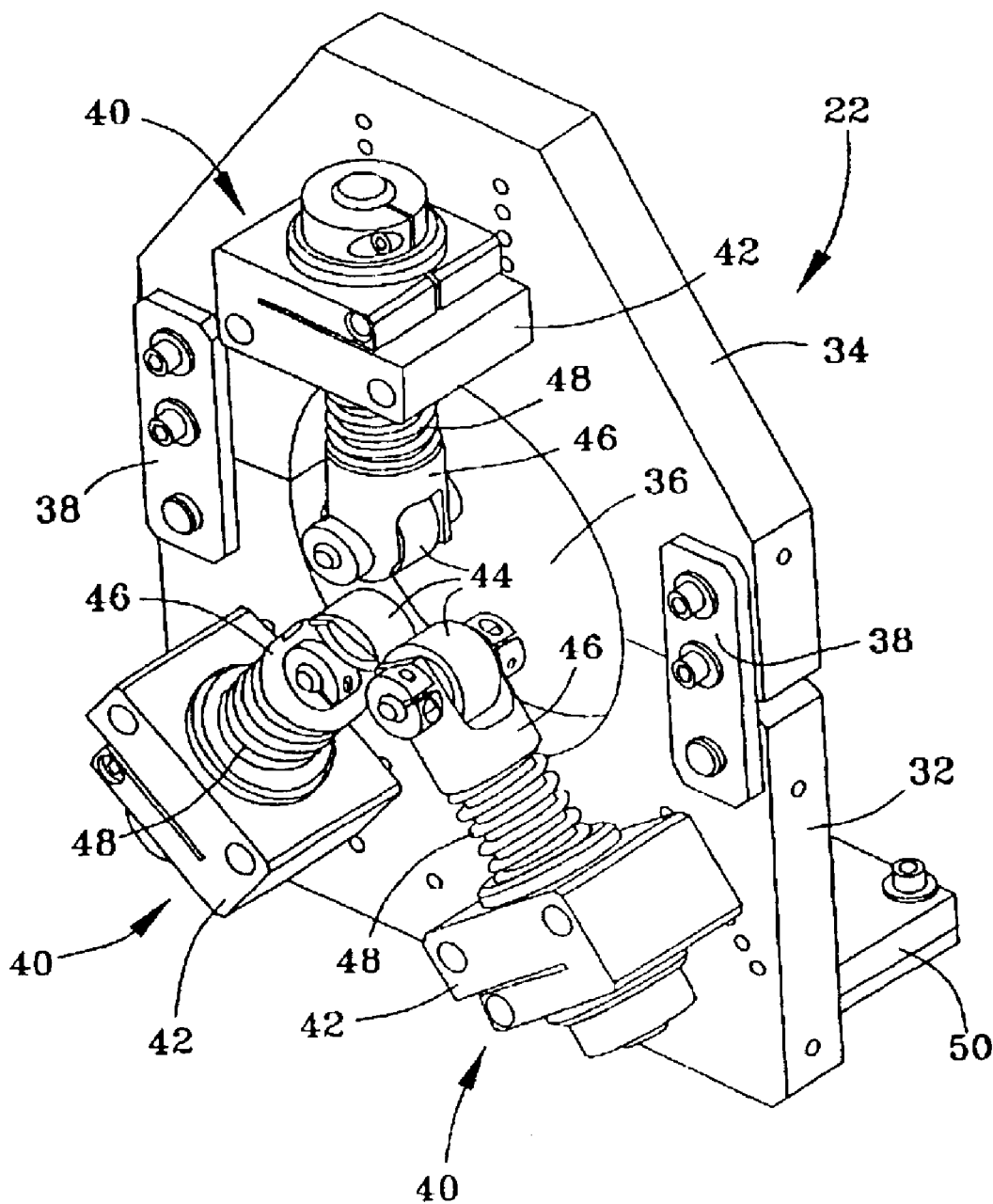
FIG. 5 is a more detailed view of a steady rest assembly of the apparatus of FIG. 1.

Finally, the steady rest 22 depicted in FIG. 4 is shown in greater detail in FIG. 5. The steady rest 22 is adapted to retain and support the tube stock in the immediate vicinity of the welding heads 24 and 26 throughout the welding operation. The rest 22 has a base 50 for mounting to the upper flange of the frame 12, as seen in FIG. 4. The base 50 supports a pair of rest members 32 and 34 that are pivotally connected together with clasps 38. Together, the members 32 and 34 define a through-hole 36 sized to accommodate tube stock in a variety of diameters. By releasing one of the clasps 38, the upper rest member 32 is able to be pivoted relative to the lower member 32, allowing a tube stock to be placed in or removed from the steady rest 22 through the resulting gap between the members 32 and 34, as can be seen in FIG. 4.

The steady rest 22 is equipped with hardware 40 for supporting and retaining the tube stock. The hardware 40 comprises electrically insulated brackets 42 that support shaft followers 46 equipped with rollers 44. The axes of rotation of the rollers 44 are oriented parallel to the axis 64 of the tube stock, so that the rollers 44 ride on the surface of the tube stock as it rotates. The brackets 42 are configured to securely clamp the shaft followers 46 to prevent movement after being adjusted to accommodate the particular diameter of tube stock to be welded. The shaft followers 46 are mounted with springs 48, so that the rollers 44 are biased against the surface of the tube stock, and so that irregular tube sizes and tubes with varying diameters can be accommodated and firmly retained. As a result of its construction and permanent location next to the welding heads 24 and 26, the steady rest 22 of this invention is able to continuously provide firm support to the tube stock, reducing any sagging or movement that could lead to inconsistent welds and deformation of the tube stock.

While the invention has been described in terms of a preferred embodiment, it is apparent that other forms could be adopted by one skilled in the art. Therefore, the scope of the invention is to be limited only by the following claims.

What is claimed is:

1. A welding apparatus comprising:

an elongate frame;

first and second support means for supporting a tube stock relative to the frame and for rotating the tube stock about a central axis thereof, the tube stock being inclined relative to horizontal when supported by the first and second support means;

a welding carriage mounted to the frame and adapted for travel along the frame, the welding carriage supporting an overlay welding head for depositing an overlay weld on a surface region of the tube stock as the tube stock is rotated and supporting a wash welding head for reducing a heat-affected zone in the surface region as the tube stock is rotated;

a steady rest mounted adjacent the welding carriage for movement with the welding carriage along the frame, the steady rest being adapted to rotatably support a portion of the tube stock in proximity to surface regions of the tube stock on which the overlay weld is being deposited and the heat-affected zone is being reduced by the overlay and wash welding heads; and means for delivering a cooling medium to the interior of the tube stock as the tube stock rotates on the frame, wherein flow of the cooling medium through the interior of the tube stock is promoted as a result of the tube stock being inclined.

2. The welding apparatus according to claim 1, wherein the frame is inclined relative to horizontal and the tube stock is supported approximately parallel to the frame.

3. The welding apparatus according to claim 1, wherein the first and second support means comprise a head stock assembly and a tail stock assembly, respectively, mounted on the frame.

4. The welding apparatus according to claim 3, wherein the head stock assembly and the tail stock assembly support oppositely-disposed ends of the tube stock.

5. The welding apparatus according to claim 1, wherein the steady rest comprises first and second members that together define an opening for diametrically receiving the tube stock, the first and second members being pivotally connected together so as to enable at least one of the first and second members to be pivoted to define an access between the first and second members through which the tube stock can pass for mounting and removing the tube stock from the welding apparatus.

6. The welding apparatus according to claim 1, wherein the steady rest is secured to the welding carriage and the frame.

7. The welding apparatus according to claim 1, wherein the tube stock is supported to be inclined about five degrees from horizontal.

8. The welding apparatus according to claim 1, further comprising means for providing a feedback signal indicating travel speed of the weld carriage along the frame.

9. The welding apparatus according to claim 1, further comprising means for providing a feedback signal indicating rotation speed of the tube stock.

10. The welding apparatus according to claim 1, further comprising means for delivering a shielding gas to the overlay and wash welding head and means for providing a feedback signal indicating shielding gas pressure.

11. The welding apparatus according to claim 1, further comprising means for providing a feedback signal indicating distance between the overlay welding head and the surface region of the tube stock.

12. The welding apparatus according to claim 1, further comprising means for providing a feedback signal indicating distance between the wash welding head and the surface region of the tube stock.

13. The welding apparatus according to claim 1, further comprising means for feeding a filler material to the overlay welding head and means for providing a feedback signal indicating the speed at which the filler material is fed to the overlay welding head.

14. The welding apparatus according to claim 1, further comprising:
   means for providing a feedback signal indicating travel speed of the weld carriage along the frame;
   means for providing a feedback signal indicating rotation speed of the tube stock,
   means for providing a feedback signal indicating shielding gas pressure;
   means for providing a feedback signal indicating distance between the overlay welding head and the surface region of the tube stock;
   means for providing a feedback signal indicating distance between the wash welding head and the surface region of the tube stock; and
   means for providing a feedback signal indicating the speed at which the filler material is fed to the overlay welding head.

15. The welding apparatus according to claim 14, further comprising means for shutting down the electric power source based on any one or more of the feedback signals from the travel speed feedback means, the rotation speed feedback means, and the gas pressure feedback means.

16. The welding apparatus according to claim 14, further comprising means for shutting down the electric power source based on any one or more of the feedback means.

17. A spiral overlay welding apparatus comprising:
   an elongate frame inclined at least about five degrees relative to horizontal;
   a head stock assembly and a tail stock assembly mounted on the frame for supporting oppositely-disposed ends of a tube stock relative to the frame and for rotating the tube stock about a central axis thereof, the tube stock being inclined relative to horizontal when supported by the head stock assembly and tail stock assembly as a result of being supported approximately parallel to the frame;
   a welding carriage mounted to the frame and adapted for travel along the frame, the welding carriage supporting an overlay welding head for depositing an overlay weld on a surface region of the tube stock as the tube stock is rotated and supporting a wash welding head for reducing a heat-affected zone in the surface region as the tube stock is rotated;
   an electric power source delivering welding currents to the overlay and wash welding heads;
   means for feeding a filler material to the overlay welding head;
   means for delivering a shielding gas to the overlay and wash welding heads;
   a steady rest mounted adjacent the welding carriage for movement with the welding carriage along the frame, the steady rest being adapted to rotatably support a portion of the tube stock in proximity to surface regions of the tube stock on which the overlay weld is being deposited and the heat-affected zone is being reduced by the overlay and wash welding heads; and
   means for delivering a cooling medium to the interior of the tube stock as the tube stock rotates on the frame, wherein flow of the cooling medium through the interior of the tube stock is promoted as a result of the tube stock being inclined.

18. The welding apparatus according to claim 17, wherein the steady rest comprises:
   upper and lower members that together define an opening for diametrically receiving the tube stock, the upper and lower members being pivotally connected together so as to enable the upper member to be pivoted to define an access between the upper and lower members through which the tube stock can pass for mounting and removing the tube stock from the welding apparatus;
   at least first and second biased followers mounted to the lower member for supporting the tube stock from beneath; and
   at least a third biased follower mounted to the upper member for urging the tube stock into contact with the at least first and second biased followers.

19. The welding apparatus according to claim 17, wherein the steady rest is secured to the welding carriage and the frame.

20. The welding apparatus according to claim 17, further comprising a pendant control unit housing input means for controlling rotation of the tube stock, travel speed of the welding carriage along the frame, the electric power source, the filler material feeding means, and the shielding gas delivering means.

* * * * *